US008356022B2

(12) United States Patent
Eisenreich

(10) Patent No.: US 8,356,022 B2
(45) Date of Patent: Jan. 15, 2013

(54) APPROXIMATE REPRESENTATION AND PROCESSING OF ARBITRARY CORRELATION STRUCTURES FOR CORRELATION HANDLING IN DATABASES

(75) Inventor: Katrin Eisenreich, Dresden (DE)

(73) Assignee: SAP AG, Walldorf (DE)

( * ) Notice: Subject to any disclaimer, the term of this patent is extended or adjusted under 35 U.S.C. 154(b) by 197 days.

(21) Appl. No.: 12/879,605

(22) Filed: Sep. 10, 2010

(65) Prior Publication Data

US 2012/0066194 A1   Mar. 15, 2012

(51) Int. Cl.
*G06F 17/30* (2006.01)
(52) U.S. Cl. ...................................................... 707/705
(58) Field of Classification Search .................. 707/705; 705/37, 35
See application file for complete search history.

(56) References Cited

U.S. PATENT DOCUMENTS

| | | | | |
|---|---|---|---|---|
| 2004/0111358 A1* | 6/2004 | Lange et al. | ..................... | 705/37 |
| 2004/0133439 A1* | 7/2004 | Noetzold et al. | ................... | 705/1 |
| 2004/0225629 A1* | 11/2004 | Eder | .............. | 706/46 |
| 2005/0027645 A1* | 2/2005 | Lui et al. | ......................... | 705/38 |
| 2006/0184473 A1* | 8/2006 | Eder | .............. | 706/20 |
| 2008/0256069 A1* | 10/2008 | Eder | .............. | 707/5 |
| 2009/0182774 A1* | 7/2009 | Krig | .............. | 707/104.1 |
| 2011/0081955 A1* | 4/2011 | Lange et al. | ...................... | 463/6 |
| 2012/0022995 A1* | 1/2012 | Lange | .............. | 705/37 |
| 2012/0066194 A1* | 3/2012 | Eisenreich | .................... | 707/705 |

OTHER PUBLICATIONS

P. Agrawal et al., Trio: A System for Data, Uncertainty, and Lineage, In VLDB '06: Proceedings of the 32nd International Conference on Very Large Data Bases, pp. 1151-1154. VLDB Endowment, Sep. 2006.
H. Arnold, Dependence Modelling Via the Copula Method, CSIRO Mathematical and Information Services, Technical report, Feb. 2006, retrieved from http://www.cmis.csiro.au/techreports/docs/x00001cd.pdf. 33 pages.
D. Behan et al., "A procedure for simulation with constructed copulas," retrieved from www.soa.org/files/pdf/rsrch-final-instr-copula.pdf, accessed Jun. 7, 2010, 13 pages.
O. Benjelloun et al., "Databases with Uncertainty and Lineage," The VLDB Journal—The International Journal on Very Large Data Bases, vol. 17, issue 2, pp. 243-264, Mar. 2008.
R. Cheng et al., "Efficient join processing over uncertain data," In CIKM '06: Proceedings of the 15th ACM international conference on Information and knowledge management, pp. 738-747, New York, NY, Nov. 2006.
J. Huang et al., "A Probabilistic Database Management System," In SIGMOD '09: Proceedings of the 35th SIGMOD international conference on Management of data, pp. 1071-1074, New York, NY, Jun. 29-Jul. 2, 2009.

(Continued)

*Primary Examiner* — Jean M Corrielus
(74) *Attorney, Agent, or Firm* — Fish & Richardson P.C.

(57) ABSTRACT

Implementations of the present disclosure include receiving user input, the user input indicating a distribution type and a correlation factor, providing the distribution type and correlation factor for identifying an approximate correlation representation (ACR) histogram from a plurality of ACR histograms based on the distribution type and the correlation factor, receiving the ACR histogram, retrieving a first distribution associated with a first uncertain value and a second distribution associated with a second uncertain value from computer-readable memory, processing the ACR histogram, the first distribution and the second distribution to generate a correlation histogram that represents a correlation between the first uncertain value and the second uncertain value, and displaying the correlation histogram on a display.

19 Claims, 12 Drawing Sheets

OTHER PUBLICATIONS

Y. Ioannidis, "The history of histograms (abridged)," In Proceedings of the 29th International Conference on Very Large Data Bases (VLDB), Sep. 2003, Berlin, Germany, 12 pages.

R. Jampani et al., "MCDB: A Monte Carlo Approach to Managing Uncertain Data," In SIGMOD '08: Proceedings of the 2008 ACM SIGMOD international conference on Management of data, pp. 687-700, New York, NY, Jun. 9-12, 2008.

T. Kroll, "Copula Based Risk Aggregation," retrieved from www.azarmi.org/wp-content/.../copula-based-risk-aggregation.pdf, Dec. 2, 2009, 21 pages.

V. Ljosa et al., "Indexing arbitrary probability distributions," In Data Engineering, 2007, ICDE 2007, IEEE 23rd International Conference on Tools with Artificial Intelligence, pp. 946-955, Nov. 7-9, 2007.

Mathworks, "Simulation of dependent random variables using copulas," retrieved from www.mathworks.com/products/demos/statistics/copulademo.html, 2010, accessed Jul. 6, 2010, 16 pages.

Viswanath Poosala et al., "Improved Histograms for Selectivity Estimation of Range Predicates," Proceedings of the 1996 ACM SIGMOD International Conference on Management of Data (SIGMOD '96), Montreal, Quebec, Canada, Jun. 4-6, 1996, pp. 294-305.

Anish Das Sarma et al., "Exploiting lineage for confidence computation in uncertain and probabilistic databases," Proceedings of the 2008 IEEE 24th International Conference on Data Engineering, pp. 1023-1032, Apr. 2008, Washington, DC.

Prithviraj Sen et al., "Representing and querying correlated tuples in probabilistic databases," In Data Engineering, 2007, ICDE 2007, 23rd IEEE International Conference on Tools with Artificial Intelligence, Nov. 7-9, 2011, Boca Raton, Florida, pp. 596-605.

Sarvjeet Singh et al., "Orion 2.0: Native Support for Uncertain Data," In SIGMOD '08: Proceedings of the 2008 ACM SIGMOD, pp. 1239-1242, Jun. 9-12, 2008, Vancouver, BC, Canada.

Claudio Romano, "Applying Copula Function to Risk Management," Apr. 2002, 25 pages.

Embrechts, P., et al., "Modelling Dependence with Copulas and Applications to Risk Management," Handbook of Heavy Tailed Distributions in Finance, Sep. 10, 2001, 50 pages.

IBM Corporation,"DB2 Version 9.1 for z/OS: SQL Reference," http://publib.boulder.ibm.com/infocenter/dzichelp/v2r2/index.jsp?topic=%2Fcom.ibm.db2z9.doc.sqlref%2Fsrc%2Ftpc%2Fdb2z_bif_correlation.htm, Dec. 2011, 2173 pages.

I. Kojadinovic et al., "Modeling Multivariate Distributions with Continuous Margins Using the copula R Package," In Journal of Statistical Software, May 2010, vol. 34, Issue 9, pp. 1-20.

Oracle, "Database QL Reference," http://docs.oracle.com/cd/B19306_01/server.102/b14200/functions028.htm, Dec. 2005, 1428 pages.

Prithviraj Sen et al., "PrDB: Managing and Exploiting Rich Correlations in Probabilistic Database," The International Journal on Very Large Data Bases, vol. 18, Issue 5, Oct. 2009, pp. 1065-1090.

C. Sirangelo, "Approximate Query Answering on Multi-dimensional Data," PhD Thesis, University of Calabria, Oct. 21, 2005, 168 pages.

IBM Corporation, "SPSS Statistics Base 20—Chapter 12: Bivariate Correlations," 2011, retrieved from <ftp://public.dhe.ibm.com/software/analytics/spss/documentation/statistics/20.0/en/client/Manuals/IBM_SPSS_Statistics_Base.pdf>, 328 pages.

IBM Corporation, "SPSS Advanced Statistics 20—Chapter 2: GLM Multivariate Analysis," 2011, retrieved from <ftp://public.dhe.ibm.com/software/analytics/spss/documentation/statistics/20.0/en/client/Manuals/IBM_SPSS_Advanced_Statistics.pdf>, 184 pages.

VoseSoftware, ModelRisk 4—Empirical Copula, retrived from <http://vosesoftware.com/ModelRiskHelp/index.htm#Help_on_ModelRisk/Copulas/Copulas_in_ModelRisk.htm>, 2007, 575 pages.

Jens Lemcke etl al., "Computing a Canonical Hierarchical Schema," Enterprise Interoperability V Proceedings of the I-ESA Conferences, vol. 5, Aug. 2012, pp. 305-315.

Kastner und Saia, "The Composite Applications Benchmark Report," Aberden Group, Dec. 2006, 25 pages.

Gartner Inc., Technology Research [Online], http://www.gartner.com/technology/home.jsp. [Accessed: Sep. 30, 2011].

D. Beneventano et al., *"The MOMIS approach to Information Integration,"* International Conference on Enterprise Information Systems (ICEIS 2001), Setúbal, Portugal, Jul. 7-10, 2001, pp. 194-198.

K. Saleem et al., "PORSCHE: Performance ORiented SCHEma mediation," *Information Systems*, vol. 33, Issue 7-8, Nov. 2008, pp. 637-657.

C. Delobel et al., "Semantic integration in Xyleme: a uniform tree-based approach," *Data & Knowledge Engineering*, vol. 44, No. 3, pp. 267-298, Mar. 2003.

R.D.S. Mello et al., "BInXS: A Process for Integration of XML Schemata," 17th International Conference on Advanced Information Systems Engineering (CAiSE 2005), Porto, Portugal, Jun. 13-17, 2005, Lecture Notes in Computer Science, vol. 3520, pp. 151-166.

Liaison Technologies, "Working with Canonicals: Using Contivo to Bring Canonicals/COMs/CIMs to Life," White Paper, Integration and Data Management, 2010, 16 pages.

Crossgate AG, Crossgate: EDI Managed Services, E-Invoicing, SAP PI, Supply Chain Analytics [Online], http://www.crossgate.de/. [Accessed: Sep. 29, 2011].

J. Madhavan et al., "Generic Schema Matching with Cupid," Proceedings of the 27th VLDB Conference, Roma Italy, Sep. 2001, pp. 49-58.

* cited by examiner

APPROXIMATE REPRESENTATION AND PROCESSING OF ARBITRARY CORRELATION STRUCTURES FOR CORRELATION HANDLING IN DATABASES

BACKGROUND

In many instances, such as developing business strategy, investigating the effect of data dependencies on business developments can help prevent inaccurate estimations of risk and opportunity. Consequently, correlation is an important factor when analyzing data, and uncertain data in particular. However, correlation information is not always present in the data. In some cases, a correlation cannot be reliably computed using existing data. For example the data may be too sparse (e.g., data about the co-occurrence of extreme insurance claims). The handling of correlation, particularly the representation of correlation over continuous distributions, has only been addressed to a small extent in uncertain data management research.

SUMMARY

Implementations of the present disclosure include methods of correlating uncertain values. In some implementations, methods include receiving user input, the user input indicating a distribution type and a correlation factor, providing the distribution type and correlation factor for identifying an approximate correlation representation (ACR) histogram from a plurality of ACR histograms based on the distribution type and the correlation factor, the plurality of ACR histograms being stored in computer-readable memory, receiving the ACR histogram, retrieving a first distribution associated with a first uncertain value and a second distribution associated with a second uncertain value from computer-readable memory, processing the ACR histogram, the first distribution and the second distribution to generate a correlation histogram that represents a correlation between the first uncertain value and the second uncertain value, and displaying the correlation histogram on a display.

In some implementations, processing the ACR histogram, the first distribution and the second distribution includes, for each bin of the ACR histogram, determining bin center-point coordinates comprising a first coordinate and a second coordinate, using the first coordinate as input to an inversion function corresponding to the first distribution to provide a third coordinate, using the second coordinate as input to an inversion function corresponding to the second distribution to provide a fourth coordinate, determining a weight associated with the bin, and applying the weight to a correlation bin of the correlation histogram, the correlation bin corresponding to the third coordinate and fourth coordinate.

In some implementations, processing the ACR histogram, the first distribution and the second distribution includes, for each bin of the ACR histogram, determining a weight associated with the bin, identifying a plurality of uniformly distributed samples within the bin, and, for each sample of the plurality of uniformly distributed samples, determining a sample coordinate comprising a first coordinate and a second coordinate, using the first coordinate as input to an inversion function corresponding to the first distribution to provide a third coordinate, using the second coordinate as input to an inversion function corresponding to the second distribution to provide a fourth coordinate, and applying a correlation weight to a correlation bin of the correlation histogram, the correlation bin corresponding to the third coordinate and fourth coordinate. In some implementations, a number of samples in the plurality of uniformly distributed samples is determined based on the weight. In some implementations, the correlation weight is determined based on the weight and a number of samples corresponding to the correlation bin.

In some implementations, each ACR histogram of the plurality of ACR histograms is generated based on a respective copula. In some implementations, the copula includes one of a Gaussian distribution copula, a T-distribution copula, a Gamma distribution copula, a Gumbel copula, a Clayton copula, and a Frank copula. In some implementations, the copula is generated based on samples of a bivariate distribution function having a first marginal distribution and a second marginal distribution. In some implementations, each of the first marginal distribution and the second marginal distribution is a one-dimensional marginal distribution that is uniformly distributed between zero and one. In some implementations, the bivariate distribution is determined based on the correlation factor. In some implementations, bins of the ACR histogram each include a weight that is determined based on samples of the copula.

In some implementations, the first distribution and the second distribution are each a univariate distribution.

In some implementations, the distribution type includes one of a Gaussian distribution, a T-distribution, and a Gamma distribution.

In some implementations, the correlation factor is greater than zero and is less than or equal to one.

In some implementations, the first distribution is of a different type than the second distribution.

In some implementations, the first distribution and the second distribution are of a same type.

In some implementations, methods further include storing the correlation histogram in computer-readable memory.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. In some implementations, the system includes a display, one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to the approximate representation and processing of arbitrary correlation structures for correlation handling in databases. More specifically, implementations of the present disclosure enable the introduction and handling of correlation of uncertain data. Uncertain data includes data that one cannot provide a discrete value for with 100% certainty, and, instead, can be given as a statistical distribution. For example, predicted or forecasted economic figures, and/or imprecise sensor measurements can be considered as uncertain data. Given present data about a plurality of arbitrarily distributed, uncertain values (e.g., an uncertain value for the gas price and a stock price), a user is able to introduce some assumed correlation between the uncertain values. This correlation can be considered in further processing of the data.

Implementations of the present disclosure introduce different forms of dependency structures over values with arbitrary marginal distributions, because multivariate distributions (discussed in further detail below) are neither uniquely defined by their marginal distributions nor their correlation factor. Instead, correlation can follow different patterns. For example, values can correlate strongly in the "middle" of the value ranges or in the "extreme values." In analysis and forecasting, it is valuable to see the implications of different assumed dependency patterns. For example, one can evaluate the expected impact when extreme values of fuel prices imply extreme increases of some related material price, while a minor fuel price increase might have no immediate effect on material prices.

Figure 1:
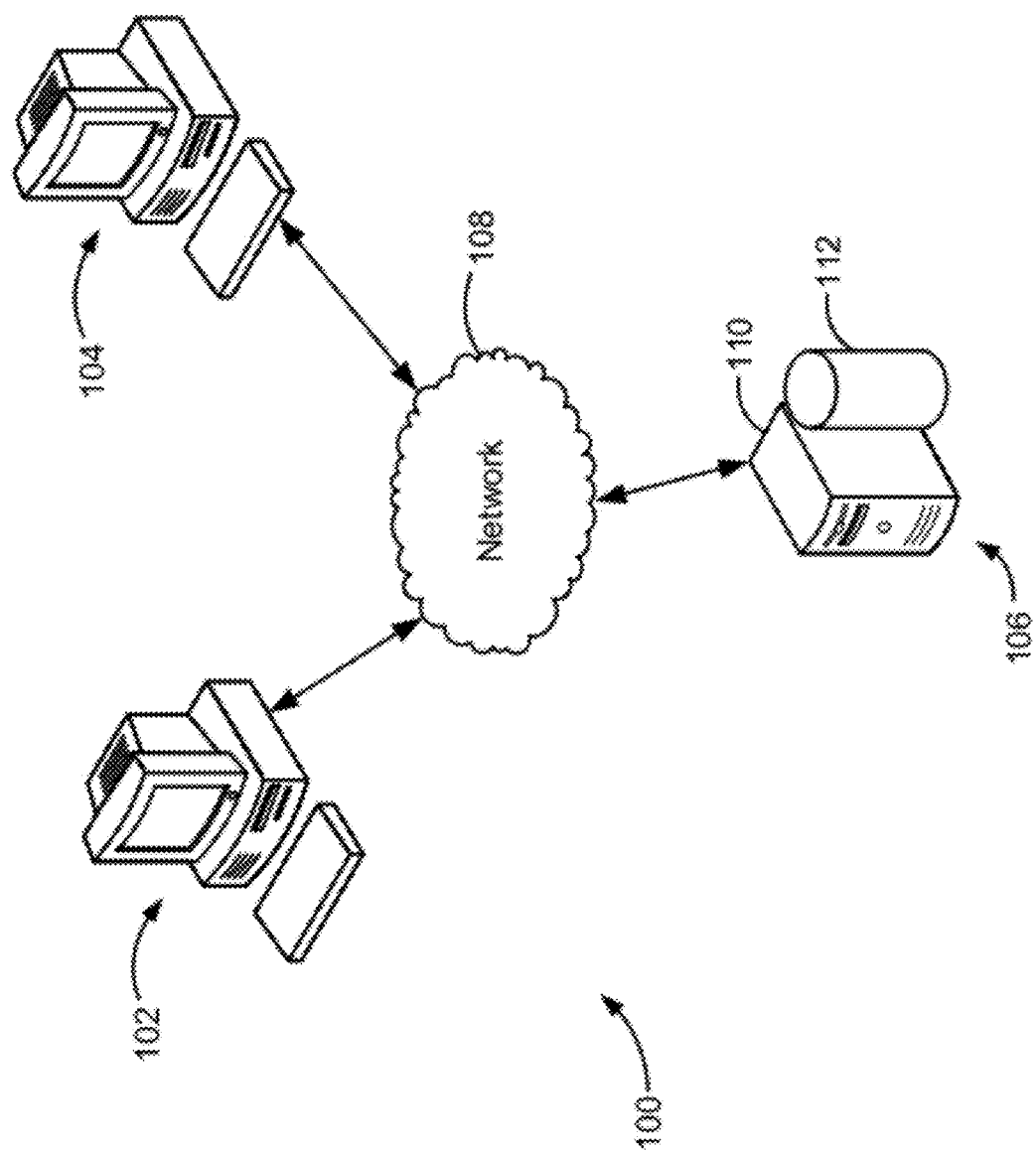
FIG. 1 depicts an example system architecture that can execute implementations of the present disclosure.

FIG. 1 depicts an example system 100 that can execute implementations of the present disclosure. The system 100 includes a computing device 102, a computing device 104, a server/database system 106 and a network 108. The computing devices 102, 104 and the server/database system 106 can communicate with one another over the network. The computing devices 102, 104 can include any type of computing device, such as a desktop computing device, a laptop computing device, a handheld computing device (e.g., a personal digital assistant (PDA)), and/or a smartphone. The server/database system 106 includes a computing device 110 and a computer-readable and -writable memory, or database 112. The computing device 110 can perform operations in accordance with implementations of the present disclosure, and the database 112 can store information, as discussed in further detail herein. The network 108 can be provided as a large computer network, such as a local area network (LAN), wide area network (WAN), the Internet, a cellular network, or a combination thereof connecting any number of computing devices and server systems.

Figure 2:
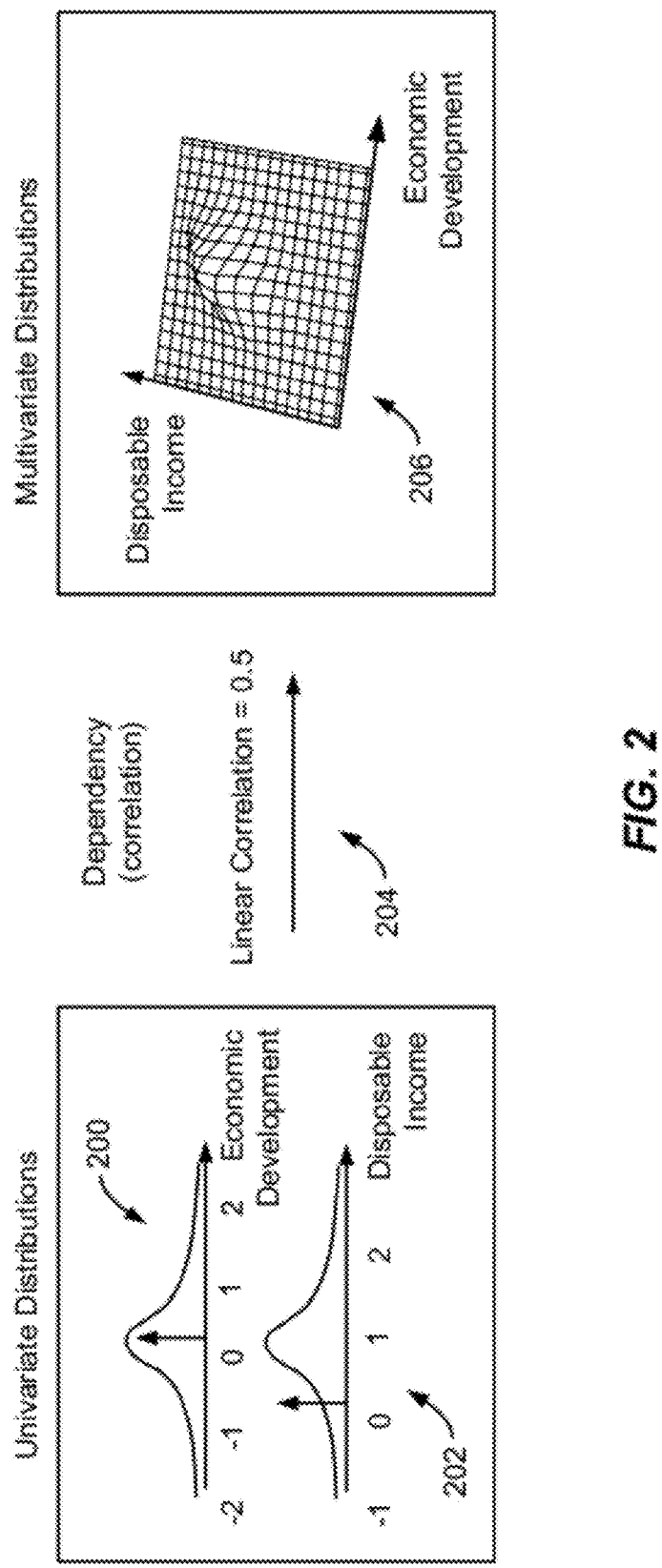
FIG. 2 depicts distributions of example uncertain values.

FIG. 2 depicts an example correlation between uncertain values. In the example of FIG. 2, the uncertain values include economic development and disposable income. Example univariate distributions 200, 202 are depicted for economic development and disposable income, respectively. Here, a univariate distribution is a probability distribution of only one uncertain variable. A correlation 204 can be provided to correlate the uncertain values. In the example of FIG. 2, the correlation 204 is provided as linear correlation having a factor of 0.5. The correlation provides a dependency between the uncertain values, in the example case, economic growth values (e.g., economic development) and consumer salaries (e.g., disposable income). As discussed in further detail herein, other correlation types and factors can be implemented. By correlating the uncertain values, a multivariate distribution 206 is provided. Here, a multivariate distribution is a joint probability distribution of multiple uncertain values, or variables. As illustrated in FIG. 2, consumer disposable income is likely to be positively correlated with economic growth development. In other examples, a positive correlation can exist between oil price and stock prices (e.g., of a company providing renewable energy), and a negative correlation can exist between sales of competing products (e.g., cases of "market cannibalization").

Implementations of the present disclosure address the introduction, storage, and application of approximate correlation information to a database containing uncertain data (i.e., values). This enables the representation of and access to different dependency structures using approximate correlation representations (ACRs) at the database level, and correlation of uncertain data following arbitrary marginal distributions. In some implementations, the respective density functions of the arbitrary marginal distributions are generically represented in a histogram-based form.

A dependency between uncertain values is represented using a corresponding, pre-computed ACR. In some implementations, the ACR is generated using a copula approach. A copula is a distribution function that represents arbitrary relations between univariate distributions and their common distribution (i.e., multivariate distribution). By way of one non-limiting example, a Gaussian copula computed from samples distributed according to a multivariate normal distribution can be used.

Figure 3A:
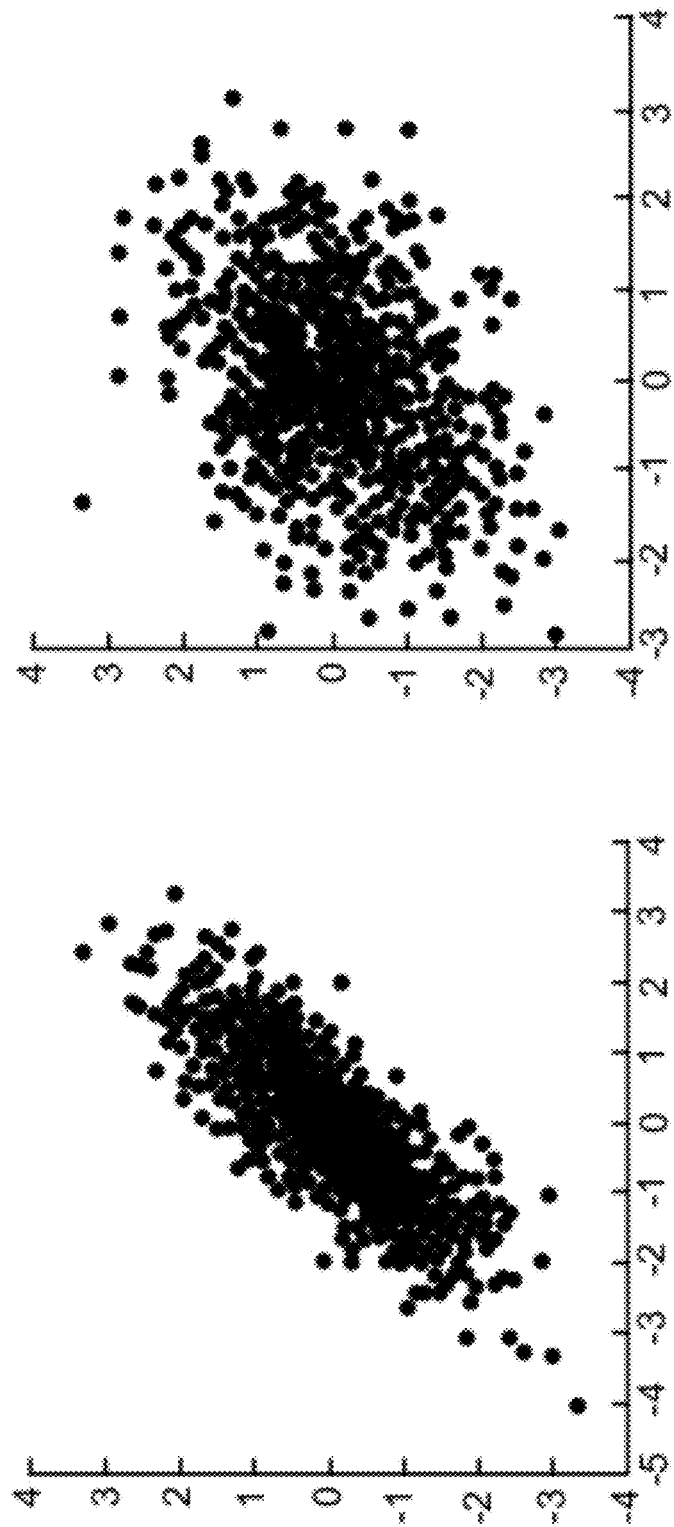
FIG. 3A depicts example bivariate Gaussian distributions using different correlation factors.
Figure 3B:
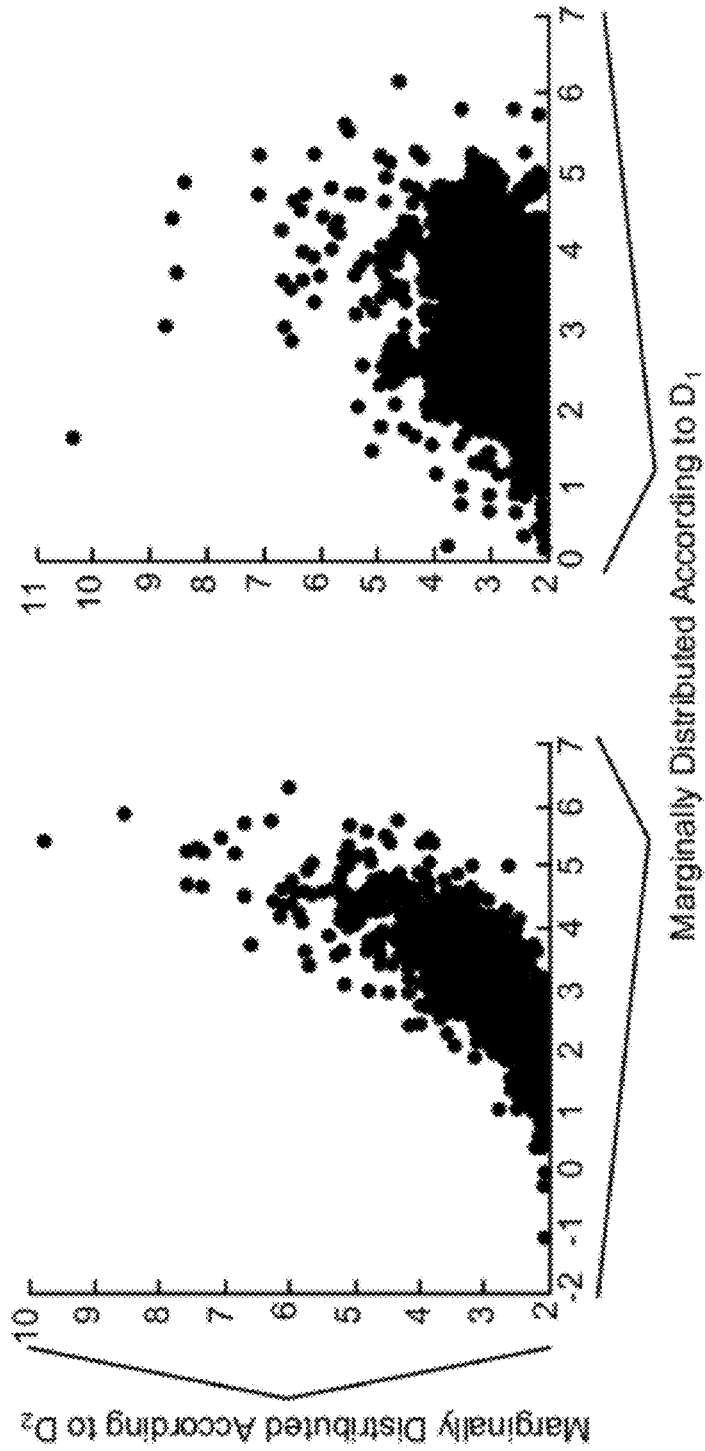
FIG. 3B depicts example multivariate distributions for example marginal distributions using different correlation factors.

With particular reference to FIGS. 3A and 3B, the correlation factor is reflected in the dependency structure and in the resulting correlated multivariate distribution. FIG. 3A provides a non-limiting example including two bivariate normal, or Gaussian distributions with a mean (0,0) and correlation of copulas 0.8 (left graph) and 0.4 (right graph), respectively. By applying a standard cumulative density function to the samples, two Gaussian copulas $C_1$, $C_2$ can be constructed, which represent a linear correlation of 0.8 and 0.4, respectively. FIG. 3B provides a non-limiting example including two bivariate distributions with linear correlation 0.8 (left graph) and 0.4 (right graph) resulting from the application of the copula to correlate marginal distributions $D_1$, $D_2$, where $D_1$ is a Gaussian distribution (e.g., mean=3, var=1) and $D_2$ is a Gamma distribution (e.g., a=1, b=2).

Figure 4:
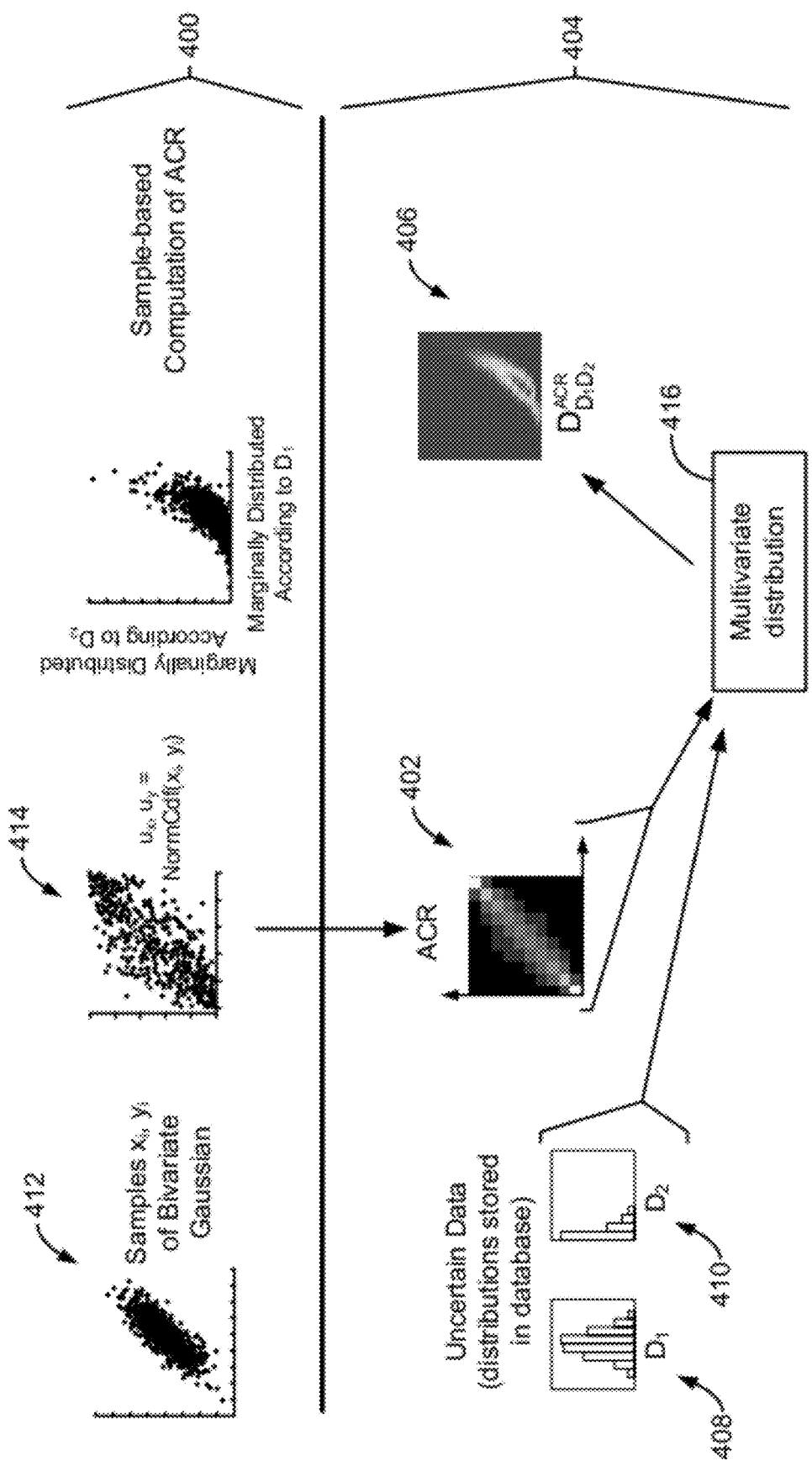
FIG. 4 is a diagram of a general process for generating and using an approximate correlation representation (ACR) to provide a correlation between multiple distributions.

Referring now to FIG. 4, a first portion 400 generally illustrates a priori specification and computation of an ACR 402, and a second portion 404 generally illustrates the use of a selected ACR (e.g., ACR 402) to generate a correlation ($D^{ACR}$) 406 between a first distribution ($D_1$) 408 and a second distribution ($D_2$) 410, corresponding to first and second uncertain values, respectively. In portion 400, sampling is performed to generate a multivariate distribution 412 characterizing a given dependency structure. For example, samples $x_i$, $y_i$ are used to generate a bivariate Gaussian distribution using a given correlation factor (e.g. 0.8). The multivariate distribution 412 is processed to generate a copula 414. Specifically, and as discussed in further detail below, inversion is implemented to construct the copula 414 from the multivariate distribution 412 (e.g., $u_x$, $u_y$=NormCdf($x_i$, $y_i$)).

As discussed in further detail below, the computed copula 414 is converted to a respective ACR 402, which is provided as a multidimensional histogram, where the frequency values of samples underlying the copula 414 are maintained. For example, lighter colors of the ACR histogram indicate higher sample frequencies and darker colors indicate lower sample frequencies. The generated ACR 402 can be stored in a data store for subsequent use. Because a copula (e.g., copula 414) is independent of the specific marginal distributions of uncertain values that are to be correlated, the ACRs can be generated and stored for various desired dependency structures and correlation ranks An ACR can be selected from a plurality of stored ACRs, and can be viewed as a "template" structure for correlation. In this case, $D^{ACR}$ is provided as a concrete instance of correlated values that is computed through application of the selected ACR.

As discussed in further detail below, a priori specification and computation of ACRs is achieved using sampling-based copula creation, and the ACR is computed and stored as a multidimensional histogram over the result of sampling-based copula creation. In portion 404, and as also discussed in further detail below, to introduce a correlation between uncertain values following respective distributions $D_i$ (e.g., $D_1$, $D_2$), an ACR is selected from a plurality of stored ACRs based on a desired type and a correlation rank, weighted samples S are derived based on the selected ACR, and the targeted multivariate distribution $D^{ACR}$ is computed by applying the inverse density function (CDF) of $D_i$ to the weighted samples S. Specifically, weighted samples are determined based on the retrieved ACR and an inverse CDF of $D_1$, $D_2$ is applied to the weighted samples (e.g., $z_x$, $z_y$=InvCdfD$_1$($u_x$), InvCdfD$_2$($u_y$), marginally distributed according to $D_1$, $D_2$). $D^{ACR}$ is computed and stored as a multi-dimensional histogram. Specifically, frequencies of a resulting multidimensional distribution 416 are computed for each $z_x$, $z_y$ by summing frequencies from the selected ACR to provide $D^{ACR}$.

A copula (Latin for "link") is a distribution function (e.g., C: $[0, 1]^n \rightarrow [0, 1]$ whose one-dimensional marginals are uniformly distributed over [0, 1]. As noted above, a copula represents a functional relation between individual distributions and their common multidimensional, or multivariate distribution. By way of non-limiting example, copulas will be considered in a bivariate case. It is appreciated, however, that the present disclosure is applicable to copulas in any multivariate case. In the bivariate case, copulas are considered for linking n=2 univariate distributions (e.g., $D_1$ and $D_2$). For the bivariate case, Sklar's theorem provides: given H as a bivariate distribution with F(x)=H(x, ∞) and G(y)=H(∞, y) as univariate marginal distributions, there exists a copula function C: $[0, 1]^2 \rightarrow [0, 1]$ so that H(x, y)=C(F(x), G(y)) ("Theorem 1"). That is, there exists a copula C relating F and G so as to form a joint distribution H with F and G as marginal distributions.

Figure 5A:
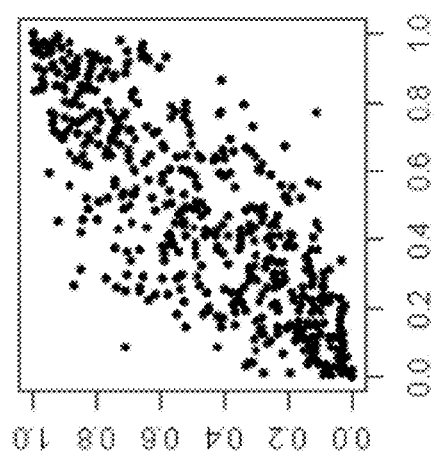
FIG. 5A depicts samples of a Gaussian distribution copula.
Figure 5B:
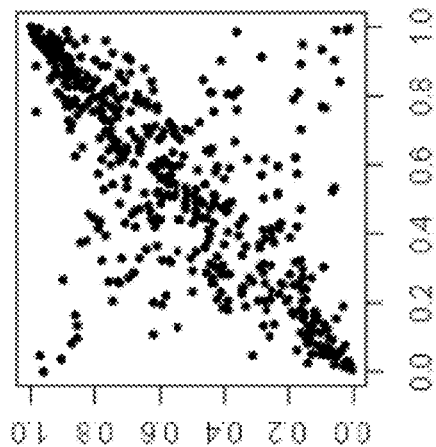
FIG. 5B depicts samples of T-distribution copula.
Figure 5C:
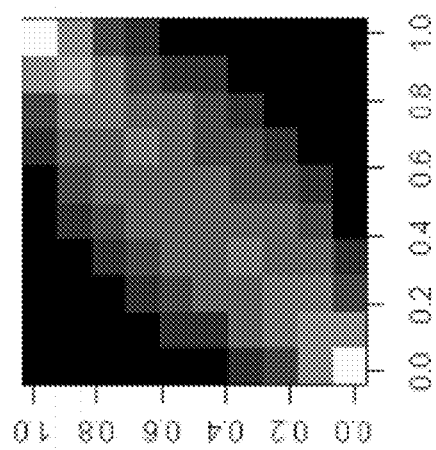
FIG. 5C depicts a histogram of an example ACR based on the Gaussian copula of FIG. 5A.
Figure 5D:
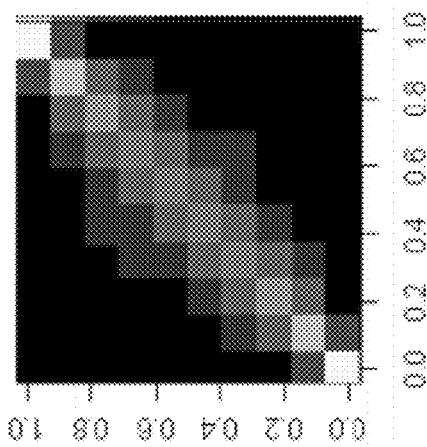
FIG. 5D depicts a histogram of an example ACR based on the T-distribution copula of FIG. 5B.

Referring now to FIGS. 5A-5D, inversion is used and Theorem 1 is exploited to yield a copula C(u, v)=H($F^{-1}$(u), $G^{-1}$(v)) directly from samples of a bivariate distribution function H with marginal distributions F and G. For example, to represent a linear correlation, a Gaussian copula can be constructed using a bivariate distribution of two standard normal variates with a specific correlation coefficient. In the following, $C_{H,d}$ denotes a copula built using a bivariate distribution function H with a given correlation factor d. For example, FIG. 5A illustrates samples of a Gaussian copula $C_{Gauss, 0.8}$ with a correlation factor of 0.8, while FIG. 5B illustrates samples of T-distribution copula $C_{T(1), 0.8}$ based on a T-distribution with one degree of freedom and a correlation factor of 0.8. The T-distribution copula of FIG. 5B has a higher dependency in the tails of the marginal distributions than the Gaussian copula of FIG. 5A, despite the copulas having the same correlation factor. FIGS. 5C and 5D provide respective ACRs of the copulas of FIGS. 5A and 5B, which represent different structures of correlation. The ACR is graphically illustrated as a histogram, where high values of a histogram bin are indicated by lighter shades (e.g., white indicating the highest value) and low values of a histogram bin are indicated by darker shades (e.g., black indicating the lowest value).

To correlate two distributions $D_1$ and $D_2$ based on a copula C, Theorem 1 is used and F and G are substituted with the marginals $D_1$ and $D_2$. That is, the samples ($u_i$, $v_i$) previously derived for copula C are inverted by computing the quantiles of $D_1$ and $D_2$. This results in samples ($D_1^{-1}(u_i)$, $D_2^{-1}(v_i)$) of the resulting joint distribution $D_{1,2}$.

The provided approach demonstrates the benefit of copulas enabling the representation of arbitrary correlation structures independently from distributions that are to be correlated. Accordingly, standard copulas can be built from basic bivariate distributions, such as the Gaussian copula and T-distribution copula, for example. Further, a copula can be derived from distributions of correlated values in a set of sample data, and the derived copula can be applied to distributions for which a similar correlation is assumed.

Figure 6:
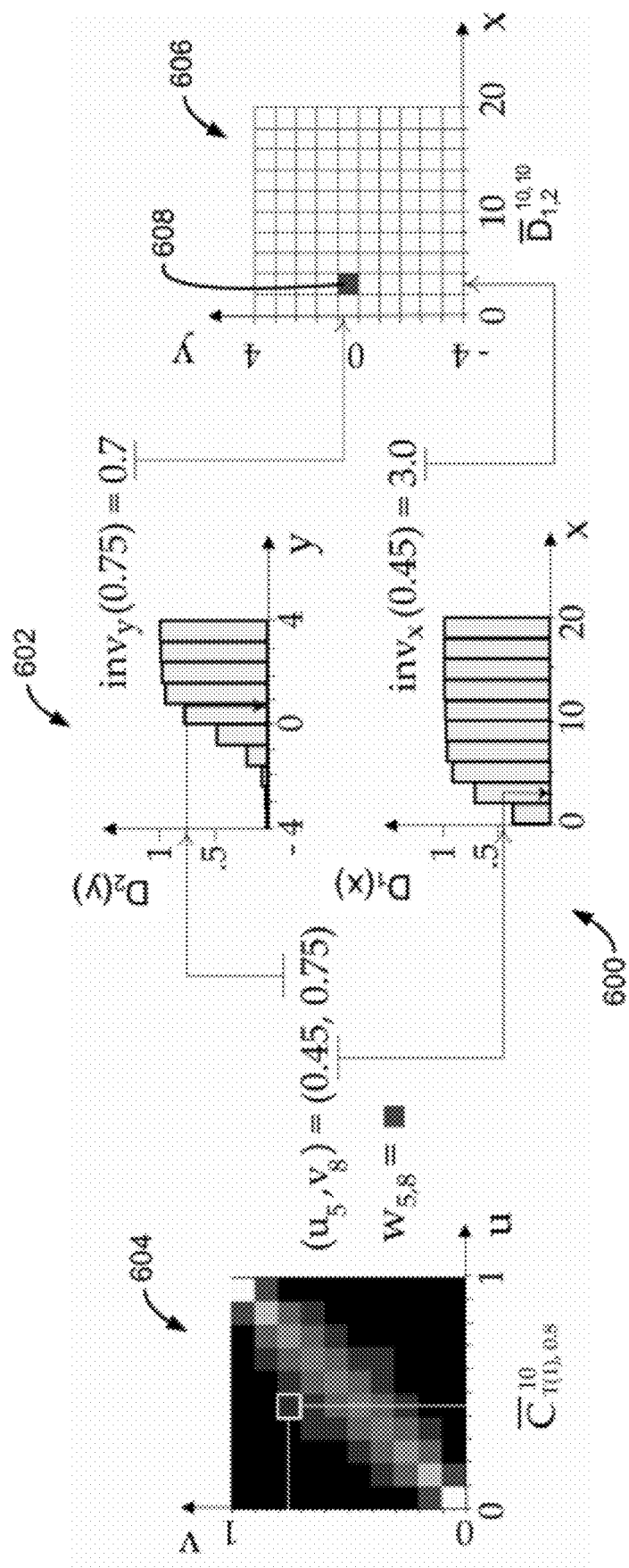
FIG. 6 depicts example calculations to provide a correlation between univariate distributions.

Referring now to FIG. 6, and to set the context for the presented approach, consider a database system enabling the handling of probabilistic, or uncertain data. Distributions can be stored as (univariate) equi-width histograms, that assume a uniform distribution within each bin. FIG. 6 illustrates histograms $\overline{D}_1^{\beta_1}$, $\overline{D}_2^{\beta_2}$, 600, 602, respectively, for two cumulative distributions $D_1$ and $D_2$. The number of bins per histogram is denoted by $\beta$ (e.g., $\beta_1$=$\beta_2$=10). By disposing of a function inv, quantiles of $D_1$ and $D_2$ can be approximately computed for a distribution by accessing a selected ACR 604. This is extended to enable users to introduce an assumed correlation between $D_1$ and $D_2$, resulting in a joint distribution represented as a bidimensional histogram $\overline{D}_{1,2}^{\beta_1\beta_2}$ 606. Internally, the copula approach is applied to represent and process the specified correlation. For processing a given ACR, as discussed in further detail herein, such quantiles are computed for bin centers or for uniformally distributed samples per bin of the ACR.

Constructing and applying copulas can involve potentially expensive computations that can be executed by calls to statistical library functions, for example. To be independent of external functions and to avoid the associated costs at runtime, the copula approach is closely integrated at the database level. To achieve this, copulas are pre-computed and are stored directly in the database as corresponding ACRs. Because storing and accessing a high number of samples for each copula may be impractical (e.g., for correlating n>2 distributions), ACRs are instead stored as multidimensional histograms over the samples underlying the copulas. Specifically, $\overline{C}_{H,d}^{\beta}$ is used to denote the ACR of copula $C_{H,d}$ with β•β bins. For example, and as noted above, FIG. 5C depicts $\overline{C}_{Gauss,\,0.8}^{10}$ and FIG. 5D depicts $\overline{C}_{T(1),0.8}^{10}$. Multiple ACRs are stored different structures (e.g., using Gaussian or T-distribution copulas) and degrees of correlation. This incurs only relatively small digital memory costs due to the small size of the ACRs.

There are multiple benefits to using ACRs as a pre-computed approximate structure. As one example benefit, a decrease in computation time is achieved, because the approximate information is already present at the database and needs not to be computed at runtime. Complex function calls are reduced to histogram accesses and only simple computations are used over the accessed values. Consequently, a second example benefit is gained via independence from statistical libraries and their distribution-specific functions.

Figure 7A:
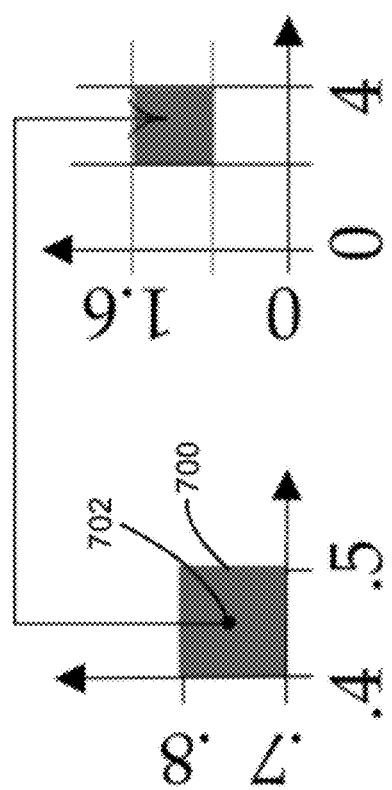
FIG. 7A illustrates a basic assignment of a weight value in a histogram.
Figure 7B:
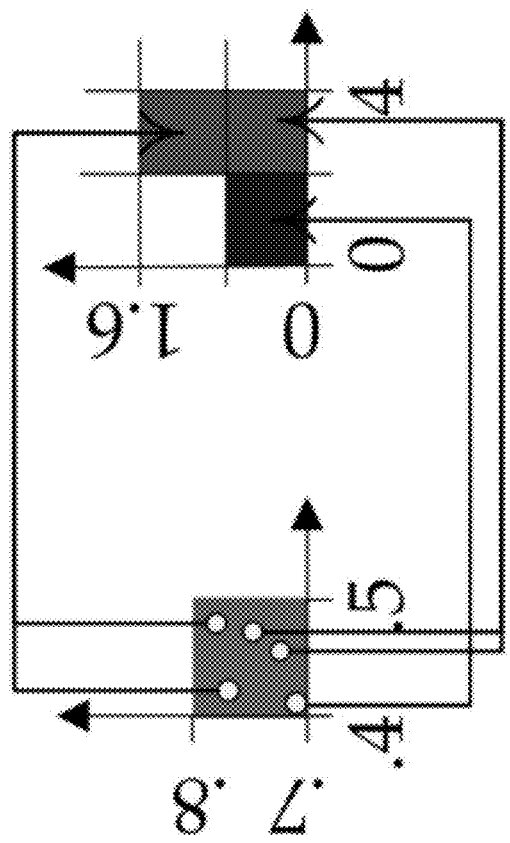
FIG. 7B illustrates distribution of the weight value in the histogram.

Referring now to FIGS. 6, 7A and 7B, the derivation of an example bivariate distribution by applying an ACR will be described. The example bivariate distribution is represented by $\overline{D}_{1,2}^{10,10}$ with marginals represented by $\overline{D}_1^{10}$ and $\overline{D}_2^{10}$. A user selects an ACR from the plurality of pre-computed ACRs stored in memory. By way of non-limiting example, to introduce a correlation with a correlation factor of 0.8 and a heavy dependency in the tails of $D_1$ and $D_2$, the ACR corresponding to $\overline{C}_{T(1),0.8}^{10}$ may be an appropriate selection. To process the ACR, the inversion approach, discussed above, is applied to the aggregated sample information represented by each bin of the ACR. Two example approaches will be described for processing the aggregated information.

With particular reference to FIG. 7A, in a basic approach, the center 702 of a bin $b_{i,j}$ 700 (where i,j=1, . . . , 10) in $\overline{C}_{T(1),0.8}^{10}$ is to provide the bin's coordinates $(u_i, v_j)$ (e.g., $(u_5, v_8)$=(0.45, 0.75) of FIG. 6). The associated density value is used as a weight ($w_{i,j}$) (e.g., $w_{5,8}$ of FIG. 6) in the following inversion. In particular, $inv_x(u_i)$ and $inv_y(v_j)$ are applied to derive the quantiles of $D_1$ and $D_2$. The weight $w_{i,j}$ (e.g., $w_{5,8}$ of FIG. 6) is added to the density of the bin in $\overline{D}_{1,2}^{10,10}$, to which $(inv_x(u_i), inv_y(v_j))$ is assigned. This is shown on the right side of FIG. 6, where the shaded bin 608 in $\overline{D}_{1,2}^{10,10}$ 606 indicates the added density value $w_{i,j}$.

In the example of FIG. 6, $u_5$ is equal to 0.45, which is used as an input to the distribution histogram of $D_1$ to determine the inverse cumulative density, or the quantile of $D_1$ at 0.45. In other words, inversion is applied to determine a value of $D_1$ for a given input value. In the example case, the corresponding value $D_1(x)$ is equal to 3.0. In the example of FIG. 6, $v_8$ is equal to 0.75, which is used as an input to the distribution histogram of $D_2$ to determine the inverse cumulative density, or the quantile of $D_2$ at 0.75. In other words, inversion is applied to determine a value of $D_2$ corresponding to a given input value. In the example case, the corresponding value $D_2(y)$ is equal to 0.7. $D_1(x)$ and $D_2(y)$ define the coordinate identifying the location in the correlation histogram where the weight $w_{i,j}$ is applied. This process is repeated for each bin of the ACR histogram.

This basic approach can result in a discretization error, because only one discrete pair of coordinates per bin $b_{i,j}$ is considered. To address this, and to compensate for a part of the discretization introduced in the construction of the ACR, the basic approach is extended by applying a "reverse sampling" process. In particular, and assuming a uniform distribution of the samples that contributed to each bin $b_{i,j}$, a number of uniformly distributed samples are drawn per bin $b_{i,j}$. The relative number of samples to be drawn is based on the associated weight $w_{i,j}$. The inversion approach is applied to each of the samples, each sample having it's own pair of coordinates $(u_x, u_y)$.

The number of samples can be determined in various manners. In some implementations, ACR bin weights (i.e., $w_{i,j}$) can be provided in relative or absolute form. For example, given a copula built from X samples (e.g., 100000 samples), if Y samples (e.g., 2000 samples) fall into bin $b_{i,j}$, then weight $w_{i,j}$ is the quotient of Y and X (i.e., $w_{i,j}$=Y/X) (e.g., 0.02 or 2000 in relative or absolute form, respectively). When given in absolute form, the number of samples can be determined directly based on the weight, or as a fraction of the weight. When given in relative form, the number of samples can be derived as the relative part of a provided total number.

FIG. 7B illustrates the resulting dispersion of the aggregated density value $w_{i,j}$ of each ACR bin to different bins of the resultant distribution. This dispersion results from drawing a number of uniformly distributed samples per ACR bin, relative to the bin weight. Because multiple samples are considered with varying center coordinates (i.e., $u_x, u_y$) within an ACR bin, the computation of the quantiles for $D_1$ and $D_2$ also results in correlation coordinates that fall into different bins of the resultant correlation histogram. This process is performed for each of bin to provide the correlation histogram $\overline{D}_{1,2}^{10,10}$.

Figure 8:
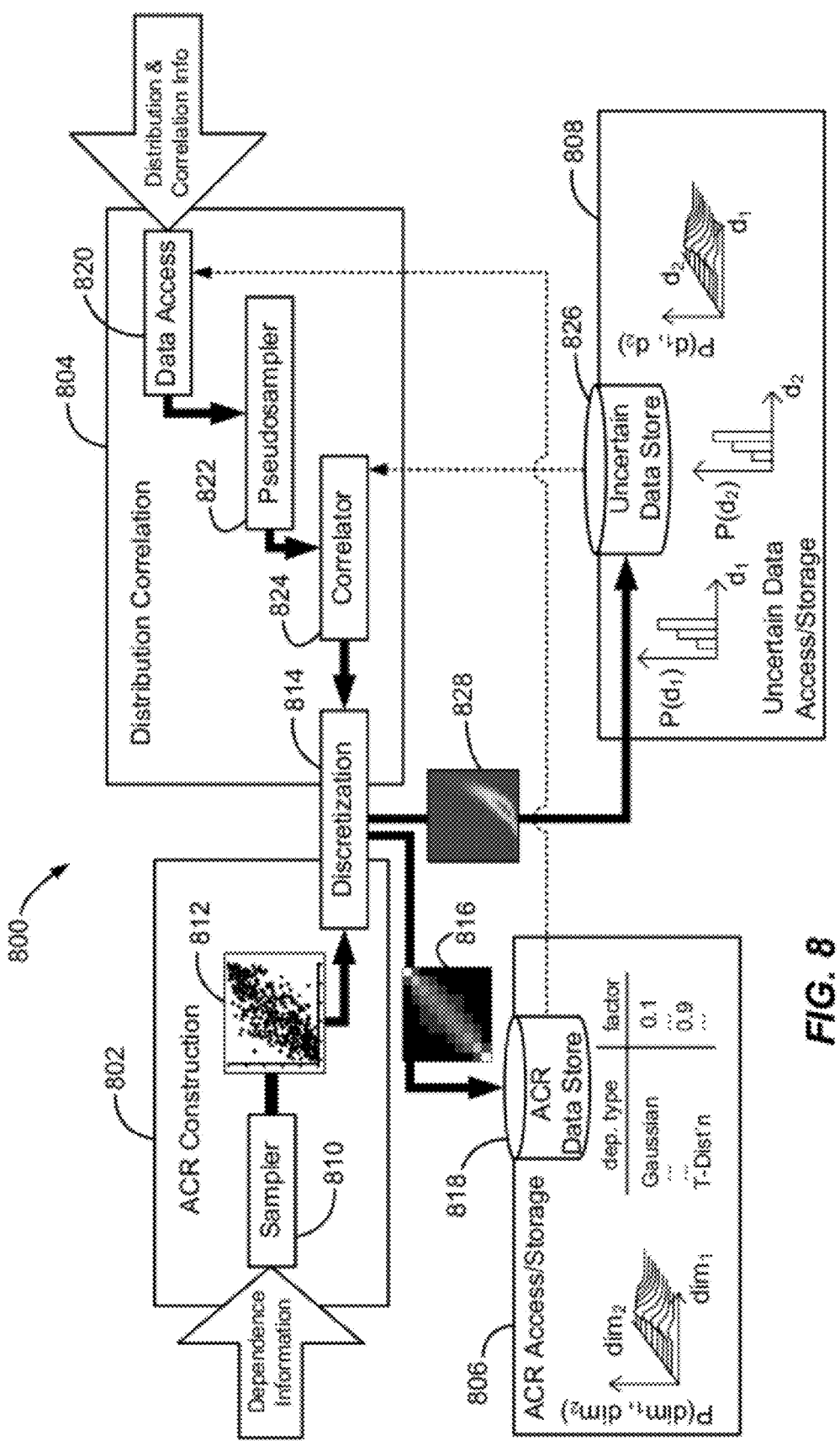
FIG. 8 is a functional block diagram of an example system for generating and using an ACR to provide a correlation between multiple distributions.

FIG. 8 is a functional block diagram of an example system 800 for generating and using an ACR to provide a correlation between multiple distributions. The system 800 can be implemented using one, both or more of the computing devices 102, 104 of FIG. 1, as well as the server/database system 106. The system 800 includes an ACR construction component 802, a distribution correlation component 804, an ACR access/storage component 806 and an uncertain data access/storage component 808. The ACR construction component 802 includes a sampler sub-component 810 that receives dependence information and processes the dependence information (e.g., distribution type and correlation factor) to provide a copula 812. The sampler component 810 executes a sampling method to create instances of a multivariate distribution (e.g., multivariate distribution 412 of FIG. 4) that characterizes the dependency structure (e.g., bivariate Gaussian with a correlation factor of 0.8). As discussed above, the copula can be generated based on any one of a number of distributions including, for example, a Gaussian distribution, a T-distribution or a Gamma distribution. Each copula can also be generated based on a respective correlation factor. For example, a first Gaussian distribution copula having a first correlation factor can be generated, and a second Gaussian distribution having a second correlation factor, different from the first correlation factor, can be generated.

The system 800 further includes a discretization sub-component 814 that is operable to generate an ACR 816 corresponding to a copula (e.g., copula 812) provided by the sampler 810. In the illustrated example, the discretization sub-component 814 is shared by the ACR construction component 802 and the distribution correlation component 804. In some implementations, the ACR construction component 802 and the distribution correlation component 804 can include respective discretization sub-components. The discretization sub-component 814 can generate the ACR 816 using the processes discussed herein. Specifically, the discretization sub-component 814 processes the copula 812 to generate the ACR 816. The ACR 816 is provided to the ACR access/storage component 806 for storage in a data store 818. The data store 818 can be a component of the ACR access/storage component 806, or can be a separate data store 818 that can be accessed by the ACR access/storage component 806.

An ACR can be selected from a plurality of ACRs stored in the data store for use in generating a correlation between uncertain values. For example, a data access sub-component 820 of the distribution correlation component 804 receives distribution and correlation information as input. The distribution and correlation information can include an indication of which uncertain values are to be correlated, and the type of correlation (e.g., Gaussian, T-Distribution, Gamma) and the correlation factor to be used to correlate the uncertain values. Using the distribution and correlation information, the data access sub-component 820 can retrieve an appropriate ACR from the ACR data store 816 and provides the ACR to a pseudosampler sub-component 822 of the distribution correlation component 804. The pseudosample sub-component 822 process the ACR to retrieve weighted samples from the ACR, and provides the weighted samples to a correlator sub-component 824 of the distribution correlation component 804. This can be achieved, for example, by drawing samples based on frequency values stored in the ACR structure.

The correlator sub-component retrieves univariate distributions (e.g., $D_1$, $D_2$) corresponding to the to be correlated uncertain values from an uncertain data store 826 that is associated with the uncertain data access/storage component 808. The correlator sub-component 824 processes the univariate distributions and the weighted samples to provide a multivariate distribution. The multivariate distribution is provided to the discretization sub-component 814, which generates a multidimensional histogram 828 (e.g., the correlation histogram $\overline{D}_{D1,D2}^{ACR}$) based on the multivariate distribution samples from the correlator. In some implementations, this process is achieved in two steps. For example, in a first step, the correlation coordinates of the result correlation samples are calculated. In a second step, the correlation histogram is built from those samples, or each correlation coordinate is immediately assigned to the corresponding correlation histogram bin. In the latter case, the discretization sub-component 814 and the correlator sub-component 824 can be provided in a single component. The correlation histogram 828, which can also be referred to as a multidimensional, or joint distribution histogram, is stored in the uncertain data store 826 and can be retrieved for further processing.

A generated correlation, or joint distribution histogram ($D^{ACR}$), can be used to evaluate the probability (e.g., in terms of chances and/or risks) of two variables taking on certain values jointly (e.g., two variables jointly taking on very high values jointly). For example, and considering two univariate distributions that each represent the value of a respective stock price within a portfolio, the joint probability of both stocks exceeding or falling below a certain threshold can be evaluated. Because the stocks can be correlated in a form other than linear, the effects of different dependency structures can be compared (e.g., applying two copulas built from a Gaussian or T-distribution, respectively). Another example is the modeling of an assumed, joint occurrence of certain insurance claims, such as rarely occurring insurance claims. In such a case, univariate distributions, $D_1$ and $D_2$, can each describe the monetary damage inflicted by events (e.g., storms and floods). A specific ACR can be applied to calculate the joint distribution of their co-occurrence. Based on the resulting correlation histogram, or joint distribution histogram ($D^{ACR}$), a risk that high monetary damages co-occur can be evaluated. Further, correlation histograms can serve as input for further operations that take a multi-dimensional histogram as input.

Figure 9A:
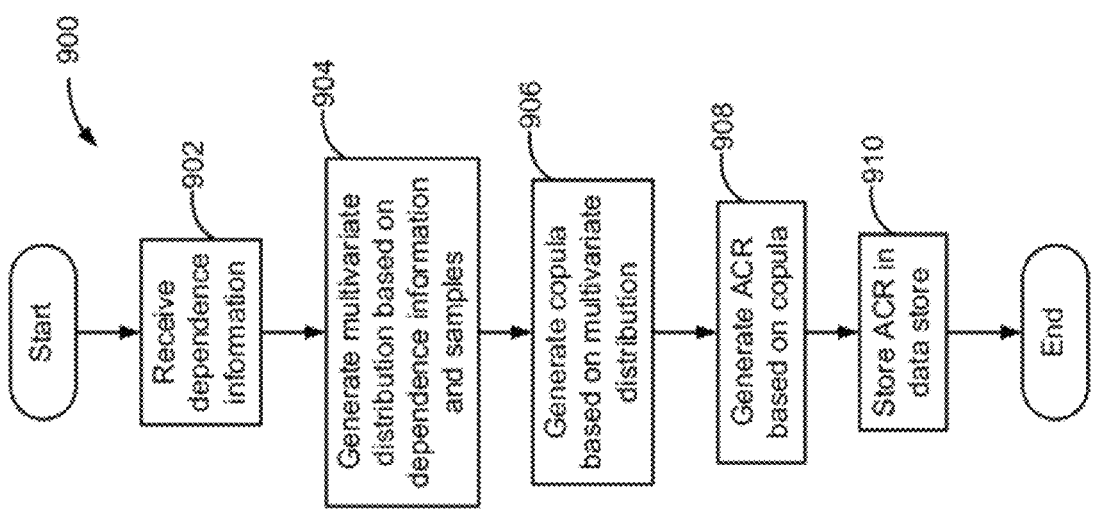
FIG. 9A is a flowchart illustrating an example process for generating an ACR.

FIG. 9A is a flowchart depicting an example process 900 for generating an ACR. The example process 900 can be executed using one or more computing devices (e.g., the computing device 102 and/or the computing device 104 of FIG. 1). Dependence information is received (902). The dependence information can include a distribution type (e.g., Gaussian, T-distribution, Gamma) and a correlation factor (e.g., 0.1, . . . , 1.0). For example, the computing device 102 can receive the dependence information as input from an operator. A multivariate distribution is generated based on the dependence information and a given number of samples (904). For example, the computing device 102 can generate the multivariate distribution based on a given number of samples (e.g., 5,000, 10,000, 40,000 samples) provided as input by the operator. A copula is generated based on the multivariate distribution (906). For example, the computing device 102 can generate the copula based on the multivariate distribution. The larger the number of samples used in generating the multivariate distribution, the more accurately the resultant copula tracks the multivariate distribution. An ACR is generated based on the copula (908). For example, the computing device 102 generates the ACR based on the copula. The ACR is stored in a data store (910) and the process 900 ends. For example, the computing device 102 can store the ACR in local memory, and/or can store the ACR in a data store of the server/database system 106 over the network 108.

Figure 9B:
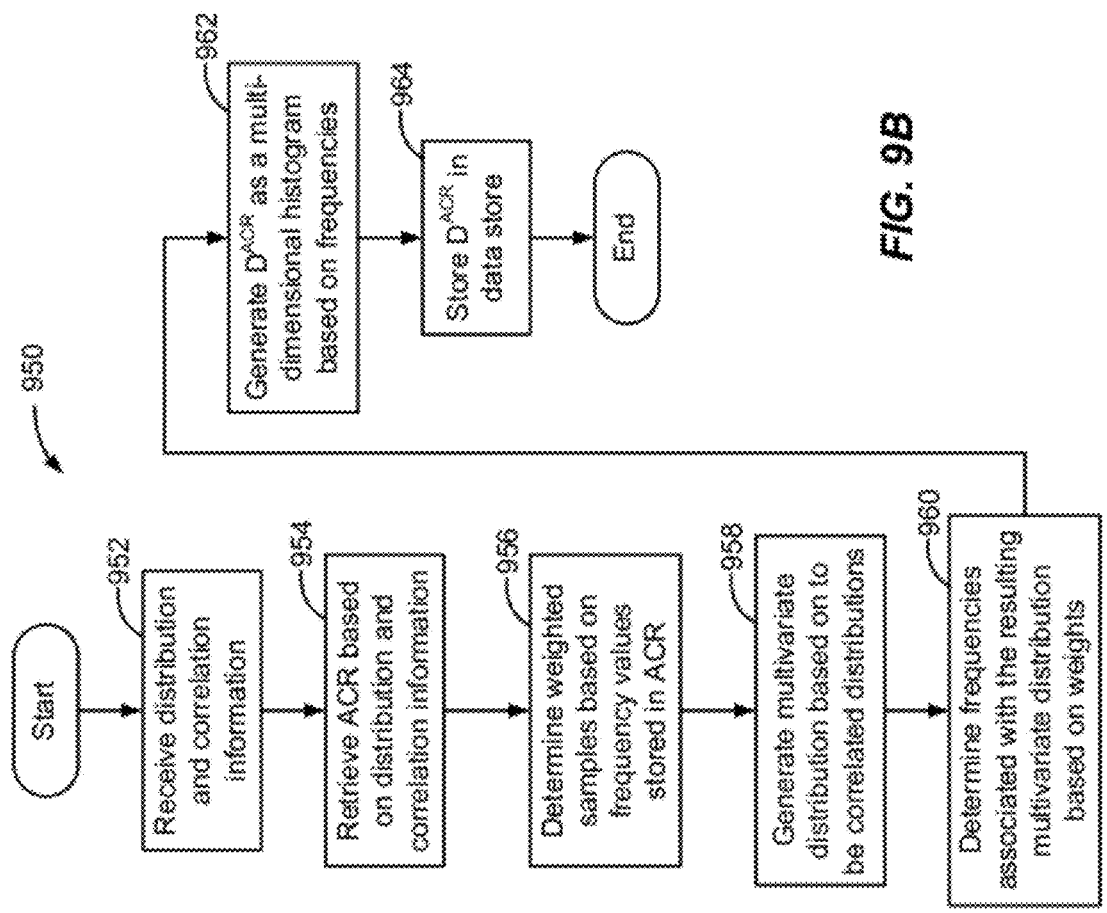
FIG. 9B is a flowchart illustrating an example process for generating a correlation between uncertain values.

FIG. 9B is a flowchart depicting an example process 950 for generating a correlation $D^{ACR}$ between uncertain values having respective univariate distributions (e.g., $D_1$, $D_2$). Distribution and correlation information is received (952). For example, the computing device 104 can receive distribution and correlation information as input from a user. The distribution and correlation information can include a distribution type (e.g., Gaussian, T-distribution, Gamma) and a correlation factor (e.g., 0.1, . . . , 1.0). An ACR is retrieved based on the distribution and correlation information (954). For example, the computing device 104 can retrieve an ACR corresponding to the distribution and correlation information from a data store, such as a data store provided by the server/database system 106, over the network 108. Specifically, the distribution and correlation information can be provided as inputs to a table of the data store to identify a corresponding ACR stored in the data store.

Weighted samples are determined based on frequency values of the ACR (956). For example, the computing device 104 can process the ACR to determine the weighted samples. A multivariate distribution is generated based on the to be correlated univariate distributions (e.g., $D_1$, $D_2$) (958). For example, the computing device 104 can generate the multivariate distribution based on the to be correlated univariate distributions (e.g., $D_1$, $D_2$). Frequencies associated with the resulting multivariate distribution are computed from weights associated with the weighted samples from the ACR (960). For example, the computing device 104 can determine the frequencies for the multivariate distribution. The frequencies can be determined based on assigning the weight of an ACR bin to the resulting correlation histogram bin as a total, or dispersing the weight based on uniformly distributed samples, as discussed in detail above. A correlation $D^{ACR}$ is generated as a mutli-dimensional histogram based on the frequencies (962). For example, the computing device 104 can generate $D^{ACR}$ as a mutli-dimensional histogram based on the frequencies. $D^{ACR}$ is stored in a data store (964) and the process 950 ends. For example, the computing device 104 can store the ACR in local memory, and/or can store the ACR in a data store of the server/database system 106 over the network 108.

Figure 10:
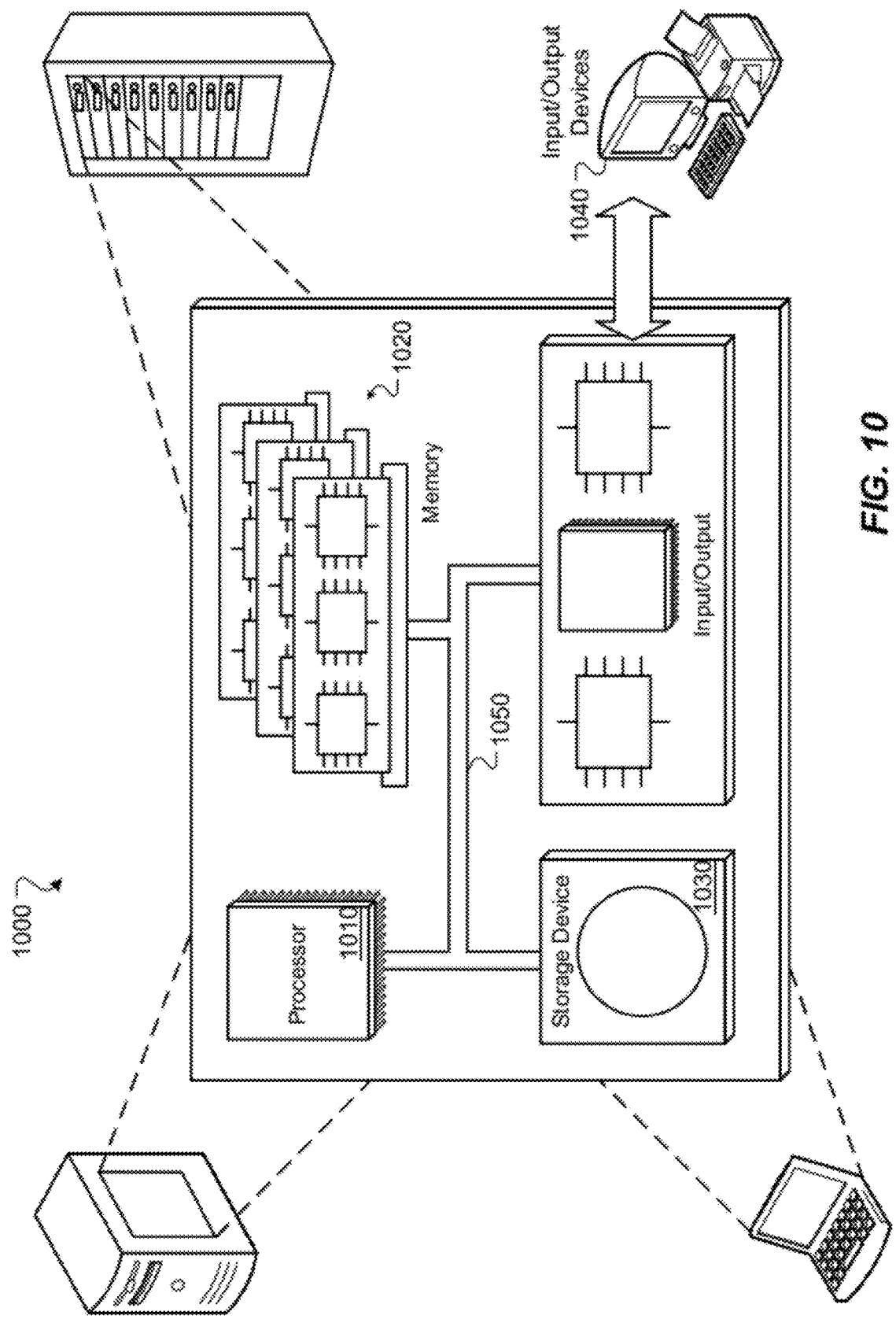
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 600. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of correlating a plurality of uncertain values, comprising:
   receiving user input, the user input indicating a distribution type and a correlation factor;
   providing the distribution type and correlation factor for identifying an approximate correlation representation (ACR) histogram from a plurality of ACR histograms based on the distribution type and the correlation factor, the plurality of ACR histograms being stored in computer-readable memory;
   receiving the ACR histogram;
   retrieving a first distribution associated with a first uncertain value and a second distribution associated with a second uncertain value from computer-readable memory;
   processing the ACR histogram, the first distribution and the second distribution to generate a correlation histogram that represents a correlation between the first uncertain value and the second uncertain value; and
   displaying the correlation histogram on a display.

2. The method of claim 1, wherein processing the ACR histogram, the first distribution and the second distribution comprises:
for each bin of the ACR histogram:
determining bin center-point coordinates comprising a first coordinate and a second coordinate;
using the first coordinate as input to an inversion function corresponding to the first distribution to provide a third coordinate;
using the second coordinate as input to an inversion function corresponding to the second distribution to provide a fourth coordinate;
determining a weight associated with the bin; and
applying the weight to a correlation bin of the correlation histogram, the correlation bin corresponding to the third coordinate and fourth coordinate.

3. The method of claim 1, wherein processing the ACR histogram, the first distribution and the second distribution comprises:
for each bin of the ACR histogram:
determining a weight associated with the bin;
identifying a plurality of uniformly distributed samples within the bin; and
for each sample of the plurality of uniformly distributed samples:
determining a sample coordinate comprising a first coordinate and a seond coordinate;
using the first coordinate as input to an inversion function corresponding to the first distribution to provide a third coordinate;
using the second coordinate as input to an inversion function corresponding to the second distribution to provide a fourth coordinate; and
applying a correlation weight to a correlation bin of the correlation histogram, the correlation bin corresponding to the third coordinate and fourth coordinate.

4. The method of claim 3, wherein a number of samples in the plurality of uniformly distributed samples is determined based on the weight associated with the bin.

5. The method of claim 3, wherein the correlation weight is determined based on the weight and a number of samples corresponding to the correlation bin.

6. The method of claim 1, wherein each ACR histogram of the plurality of ACR histograms is generated based on a copula that is associated with the respective histogram.

7. The method of claim 6, wherein the copula comprises one of a Gaussian distribution copula, a T-distribution copula, a Gamma distribution copula, a Gumbel copula, a Clayton copula, and a Frank copula.

8. The method of claim 6, wherein the copula is generated based on samples of a bivariate distribution function having a first marginal distribution and a second marginal distribution.

9. The method of claim 8, wherein each of the first marginal distribution and the second marginal distribution is a one-dimensional marginal distribution that is uniformly distributed between 0 and 1.

10. The method of claim 8, wherein the bivariate distribution is determined based on the correlation factor.

11. The method of claim 6, wherein bins of the ACR histogram each include a weight that is determined based on samples of the copula.

12. The method of claim 1, wherein the first distribution and the second distribution are each a univariate distribution.

13. The method of claim 1, wherein the distribution type comprises one of a Gaussian distribution, a T-distribution, and a Gamma distribution.

14. The method of claim 1, wherein the correlation factor is greater than zero and is less than or equal to one.

15. The method of claim 1, wherein the first distribution is of a different type than the second distribution.

16. The method of claim 1, wherein the first distribution and the second distribution are of a same type.

17. The method of claim 1, further comprising storing the correlation histogram in computer-readable memory.

18. A computer-readable storage medium coupled to one or more processors and having instructions stored thereon which, when executed by the one or more processors, cause the one or more processors to perform operations, the operations comprising:
receiving user input, the user input indicating a distribution type and a correlation factor;
providing the distribution type and correlation factor for identifying an approximate correlation representation (ACR) histogram from a plurality of ACR histograms based on the distribution type and the correlation factor, the plurality of ACR histograms being stored in computer-readable memory;
receiving the ACR histogram;
retrieving a first distribution associated with a first uncertain value and a second distribution associated with a second uncertain value from computer-readable memory;
processing the ACR histogram, the first distribution and the second distribution to generate a correlation histogram that represents a correlation between the first uncertain value and the second uncertain value; and
displaying the correlation histogram on a display.

19. A system, comprising:
a display;
one or more processors; and
a computer-readable storage medium coupled to the one or more processors and having instructions stored thereon which, when executed by the one or more processors, cause the one or more processors to perform operations, the operations comprising:
receiving user input, the user input indicating a distribution type and a correlation factor;
providing the distribution type and correlation factor for identifying an approximate correlation representation (ACR) histogram from a plurality of ACR histograms based on the distribution type and the correlation factor;
receiving the ACR histogram;
retrieving a first distribution associated with a first uncertain value and a second distribution associated with a second uncertain value from computer-readable memory;
processing the ACR histogram, the first distribution and the second distribution to generate a correlation histogram that represents a correlation between the first uncertain value and the second uncertain value; and
displaying the correlation histogram on the display.

* * * * *